United States Patent [19]
Killian, Jr. et al.

[11] Patent Number: 4,769,634
[45] Date of Patent: Sep. 6, 1988

[54] TILT APPARATUS FOR CATHODE RAY TUBE DISPLAY

[75] Inventors: John C. Killian, Jr., Sudbury; Michael W. Kleeman, Newton, both of Mass.

[73] Assignee: Digital Equipment Corporation, Maynard, Mass.

[21] Appl. No.: 862,095

[22] Filed: May 12, 1986

[51] Int. Cl.[4] .............................................. F16M 13/00
[52] U.S. Cl. .................... 340/720; 340/700; 358/249; 248/1 I
[58] Field of Search ............... 340/700, 720; 358/248, 358/249; 248/139, 140, 408, 409, 1 E, 1 H, 1 I

[56] References Cited

U.S. PATENT DOCUMENTS

| | | | |
|---|---|---|---|
| 3,784,135 | 1/1974 | Owen, Jr. | 248/1 I |
| 3,789,140 | 1/1974 | McQueen et al. | 358/249 |
| 4,372,515 | 2/1983 | Noonan | 358/249 |
| 4,471,931 | 9/1984 | Covey et al. | 248/1 I |
| 4,556,189 | 12/1985 | Kirpluk et al. | 248/1 I |

FOREIGN PATENT DOCUMENTS 0208903  7/1986  European Pat. Off. .

*Primary Examiner*—Gerald L. Brigance
*Attorney, Agent, or Firm*—Nutter, McClennen & Fish

[57] ABSTRACT

An apparatus provides a user-adjustable viewing angle for a cathode ray tube (CRT) display. The CRT may be rotated in either of two directions by depressing a control bar located along the front bezel of the display. Once set to the desired position, the control bar is released and the CRT is inhibited from rotating in both directions. Thus, the CRT may be locked in a variety of positions to suit the particular user or environmental conditions.

7 Claims, 4 Drawing Sheets

TILT APPARATUS FOR CATHODE RAY TUBE DISPLAY

BACKGROUND OF THE INVENTION

1. Field of the Invention

The invention relates generally to the area of cathode ray tube (CRT) display devices including those commonly used for terminals and personal computers. The viewing angle is a critical ergonomic factor for such devices and may be affected by several factors including the height of the user, personal preference and glare. A user-adjustable viewing angle or tilt mechanism is therefore desirable to produce an adaptable display which will operate satisfactorily under varying conditions.

2. Description of the Prior Art

One tilt mechanism known in the prior art provides an adjustable foot or brace by which the entire display device, not merely the CRT, may be tilted. The disadvantages of this type of tilt mechanism include a loss of mechanical stability and the difficulty of physically handling the display, which may be quite heavy.

Another tilt mechanism known in the prior art provides a CRT which rotates within its enclosure and which is retained in the desired position by friction. Because the frictional force is minimized to permit smooth rotation, accidental or casual contact with the CRT frequently results in a loss of position. More importantly, the CRT cannot be locked in position during shipment and handling, which may result in damage to the display.

SUMMARY OF THE INVENTION

The present invention provides a tilt apparatus for a CRT by which the user may adjust the viewing angle. The apparatus rotates the CRT within its enclosure and positively locks the CRT in a desired position. The apparatus comprises a control bar which may be depressed to freely rotate the CRT in either of two directions to a desired viewing angle. When the control bar is released, a toothed extension of the control bar engages an arcuate gear thereby inhibiting the rotation of the CRT in both directions. The teeth of the arcuate gear may be arranged such that a series of uniformly spaced viewing angles are provided. In addition, the engagement of the toothed extension with the arcuate gear is sufficient to inhibit rotation of the CRT during shipment.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
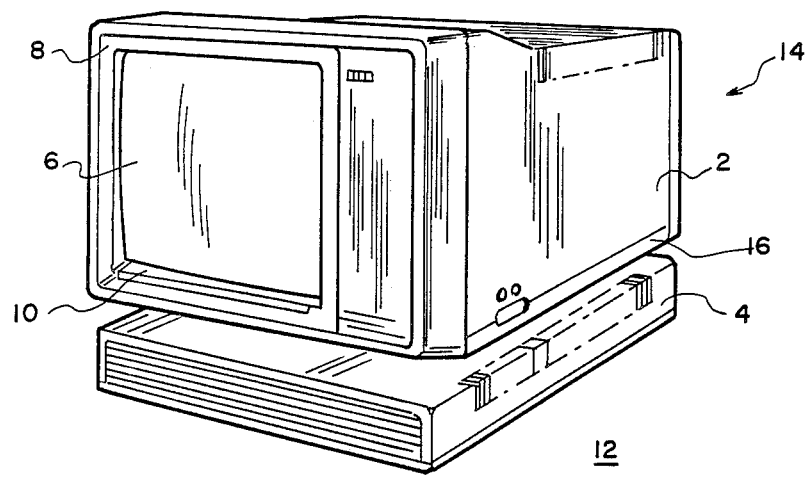
FIG. 1 is an isometric view of a computer which includes a CRT display having a user-adjustable viewing angle.

FIG. 1 is an isometric view of a CRT display device having a user-adjustable viewing angle. A computer 12 comprises a processor unit 14 and an expansion box 4. The processor unit 14 comprises a cathode ray tube or CRT 6 which is disposed within a frame 8. A cover 2 is attached to a bottom panel 16. A control bar 10 is disposed laterally along the lower front portion of frame 8.

Figure 2:
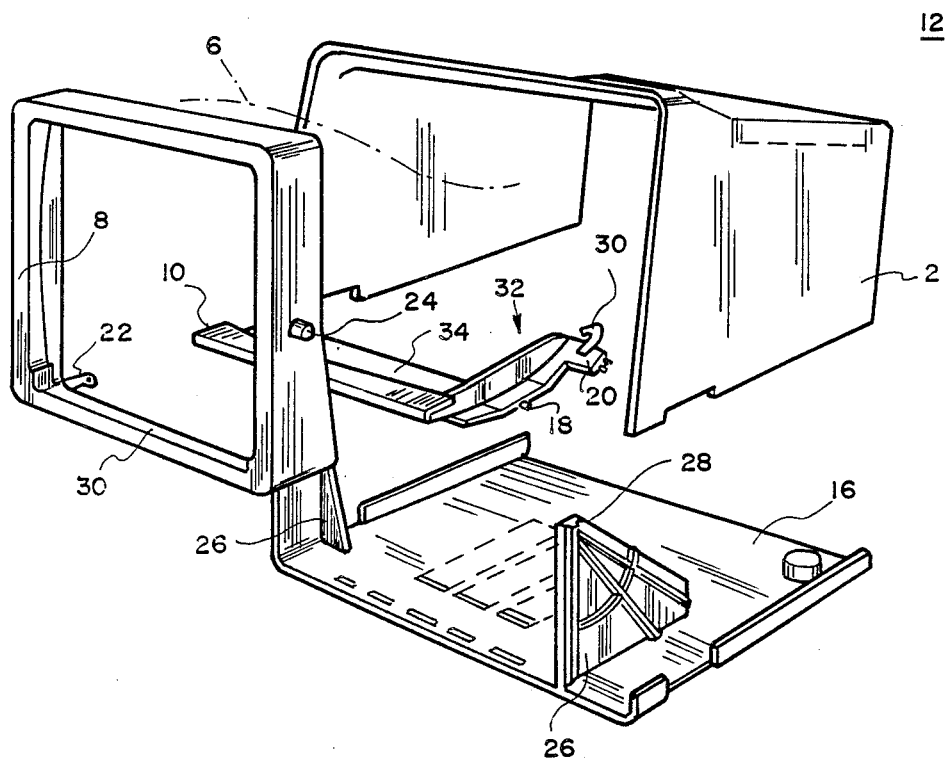
FIG. 2 is an exploded view of the device shown in FIG. 1.

As may be seen more clearly in FIG. 2, which is an exploded view of the computer 12 shown in FIG. 1, frame 8 receives the CRT 6, which is shown in dashed lines. Two sockets 22, only one of which is visible, extend backward from the lower corners of the frame 8. Two pivot members 24 (only one of which is visible) are attached to and extend laterally from opposite sides of the frame 8. As explained in detail below, the frame 8 may be attached to the CRT 6 such that pivot members 24 are located forward of the center of gravity of the CRT 6.

The frame 8 comprises a recessed lip 30 which extends laterally along the lower front portion the frame. Two supports 26, both of which are attached to the bottom panel 16, each provide a bearing 28. An angle adjustment lever 32 comprises the control bar 10, two pivot members 18 (only one of which is visible), a toothed portion 20 and a spring 30. A stiffener member 34 is disposed along the length of lever 32.

Figure 3:
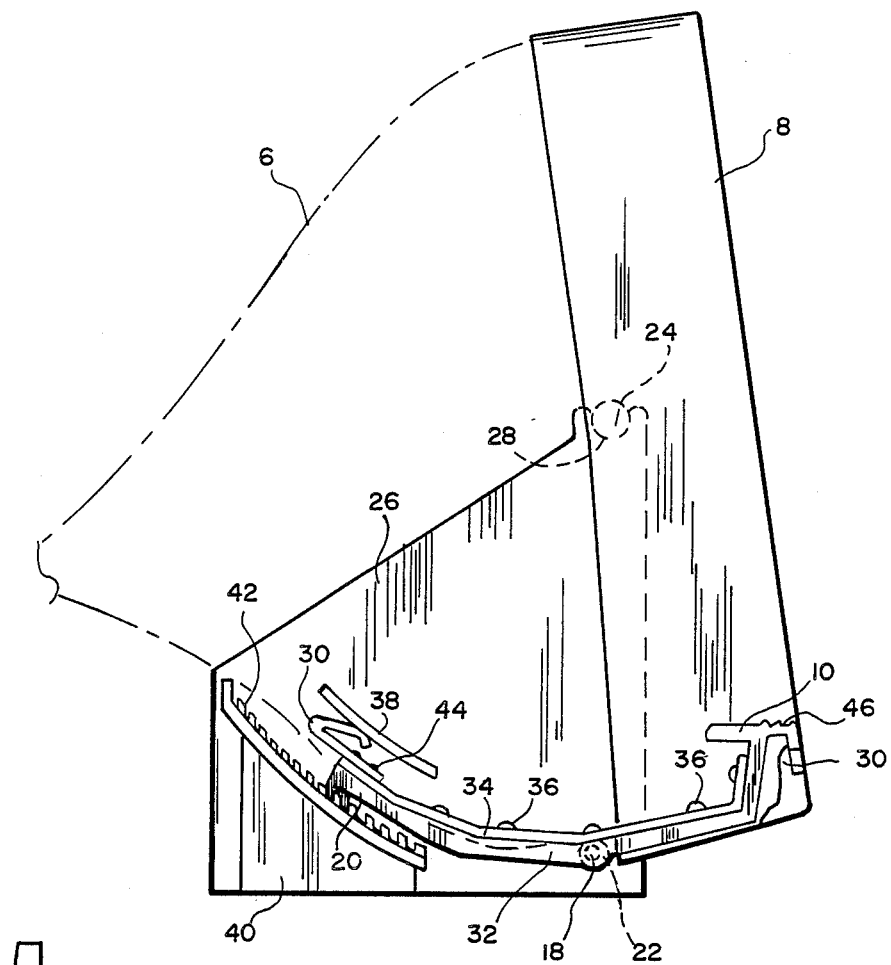
FIG. 3 is a cross-sectional view of the preferred embodiment of a cathode ray tube tilt apparatus constructed in accordance with the present invention.

Referring now to FIG. 3, which is a cross-sectional view of an assembled tilt apparatus constructed in accordance with the preferred embodiment, the control bar 10 is disposed above the recessed lip 30 and the pivot members 18 are disposed within the sockets 22. The upper surface of control bar 10 comprises a plurality of ribs 46. A plurality of fasteners 36 serves to attach the stiffener member 34 to the lever 32. The spring 30 is attached to the stiffener member 34 by way of fasteners 44. The spring 30 is disposed between the angle adjustment lever 32 and a brace member 38. An arcuate gear member 40 comprising a plurality of teeth 42 is disposed beneath the lever 32. The toothed portion 20 is engaged with the arcuate gear member 40.

Figure 4:
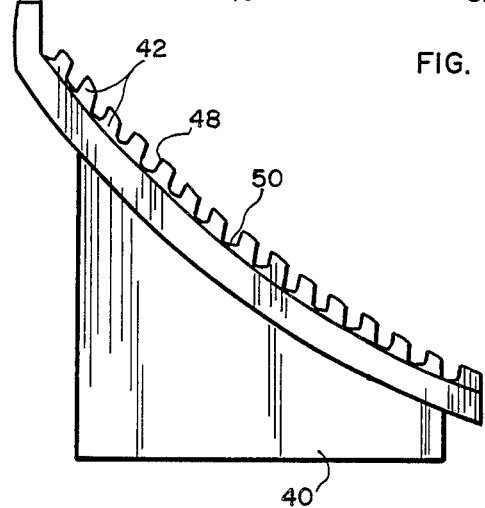
FIG. 4 is an enlarged view of the arcuate gear member shown in FIG. 3.

FIG. 4 is an enlarged view of the arcuate gear member 40 shown in FIG. 3. Each of teeth 42 comprises a rounded upper edge 48 and adjoining teeth are separated by notches 50. The teeth 42 and notches 50 may be sized to provide a series of uniform increments of rotation.

The operation of the CRT tilt apparatus may be understood with further reference to FIG. 3. As a user depresses the control bar 10 downward over the recessed lip 30, the angle adjustment lever 32 rotates about the pivot members 18 thereby causing the toothed portion 20 to move upward and disengage from the arcuate gear member 40. The spring 30 simultaneously compresses against the brace member 38 thereby providing a sensation of resistance to the user, which indicates that the toothed portion 20 is disengaged. The user may then continue to depress the control bar 10 while exerting a slight push or pull on the control bar 10. A slight push causes a clockwise rotation of the frame 8 about the pivot members 24 whereas a slight pull causes a counterclockwise rotation. In addition, if the CRT 6 is attached to the frame 8, as described above, whereby the pivot members 24 are located forward of the center of gravity of the CRT 6, the CRT 6 will have a natural tendency to rotate in a counterclockwise direction.

The result is a tilting of the CRT 6 with respect to the user. Subsequently, when the desired viewing angle is reached, the user may release the control bar 10 whereby the spring 30 expands and forces the toothed portion 20 to engage the arcuate gear member 40. Once the toothed portion 20 engages the arcuate gear member 40, the frame 8 and CRT 6 are "locked" in position.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. An image display unit comprising:
   1. display means for displaying images, said display means including an image display face;
   2. a frame for supporting said image display means, said frame having pivot means located proximate to said image display face a portion of said display means extending rearwardly beyond said frame;
   3. a housing enclosing said pivot means and said portion of said display, said housing including integral pivot support means for supporting said pivot means thereby providing for rotation of said frame and said display means about a horizontal axis;
   4. adjusting means for rotating said frame about said axis, thereby varying the angular position of said image display means, said adjusting means including:
      a. locking means controllable from the front of said image display means to lock and unlock the angular position of said image display means said locking means being positioned so that said frame rotates with the normal of said image display face rotating downwardly when said locking means is unlocked and a force is applied to said locking means in the downward direction; and
      b. means for urging said frame to rotate such that the normal of said image display face rotates upwardly when said locking means is unlocked but no force is applied thereto.

2. The apparatus of claim 1, wherein said locking means is comprised of:
   1. a gear fastened to said housing; and
   2. a control bar disposed at the front of said image display means and pivotally attached to said frame, said control bar being actuated by depressing said bar in a direction opposite the direction in which said frame is urged to rotate by said urging means.

3. The apparatus of claim 2, wherein said locking means is further comprised of:
   1. a toothed member extending from said control bar and responsive to said control bar; and
   2. a spring urging said toothed member into engagement with said gear;
   3. whereby:
      a. said toothed member normally engages said gear thereby locking said frame against rotation, and
      b. said toothed member is disengaged from said gear by actuation of said control bar, thereby unlocking said frame means and permitting rotation of said frame about said axis.

4. The image display unit of claim 3, wherein said gear is an arcuate gear.

5. The display unit of claim 2, wherein said control bar is disposed in a recess in said frame which extends laterally across the lower front portion of said frame.

6. The image display unit of claim 1, wherein said gear is an arcuate gear.

7. The image display unit of claim 1, wherein the center of gravity and the mass of said image display means and said frame are such taht the display face rotates upwardly under the force of gravity when said locking means is unlocked.

* * * * *